United States Patent Office 3,448,206
Patented June 3, 1969

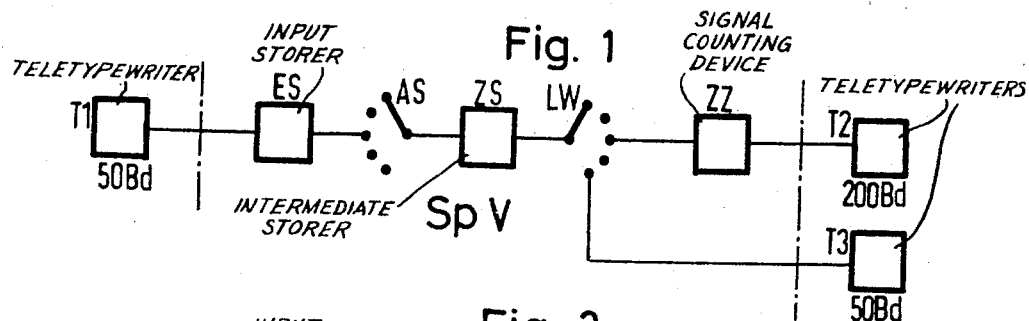
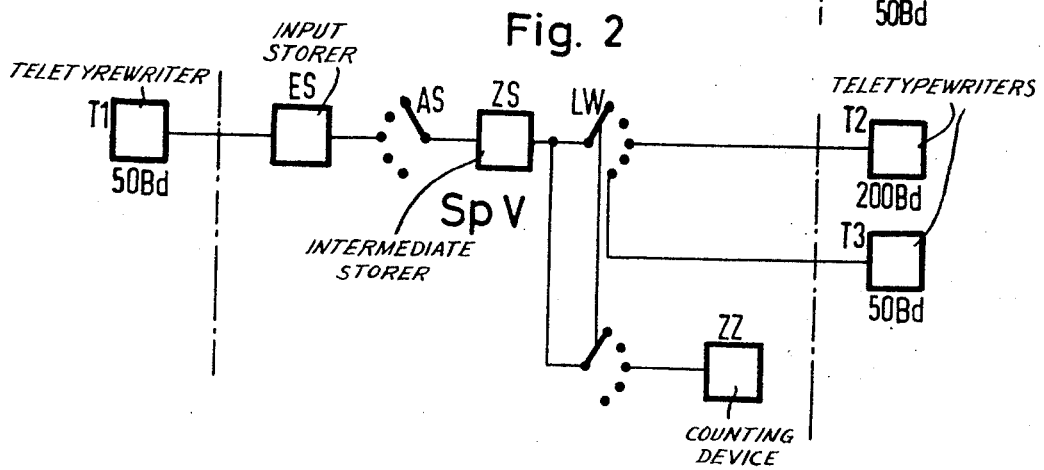
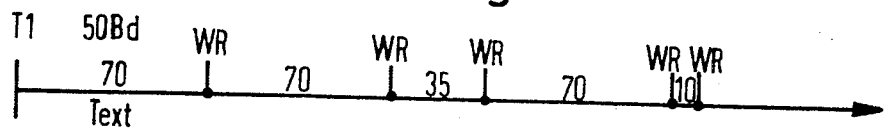
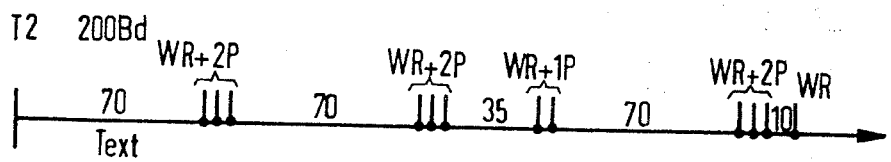

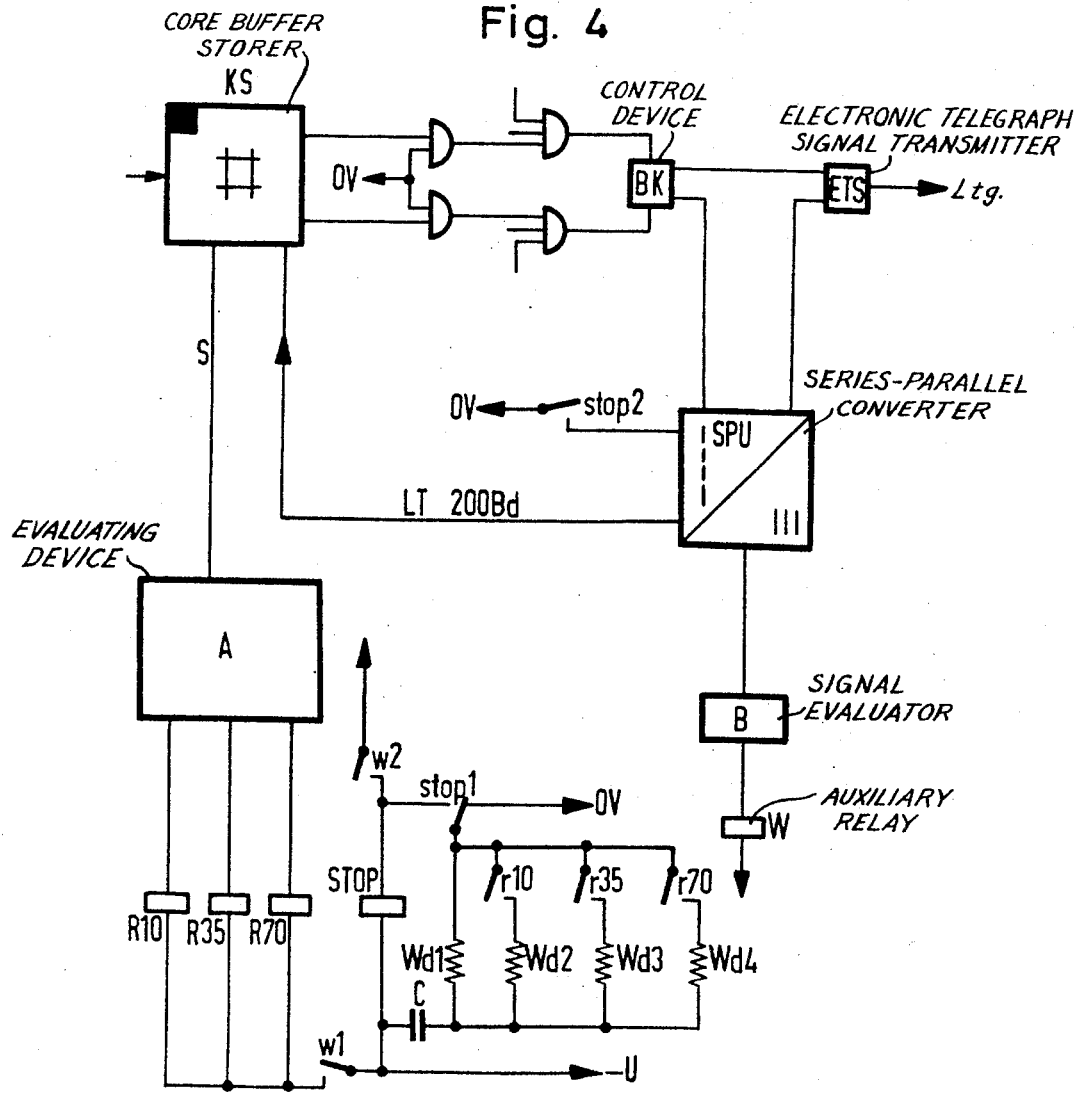

3,448,206
TELETYPEWRITER SYSTEM WITH AT LEAST ONE SHEET TELETYPEWRITER MACHINE
Ehrhard Rossberg, Munich, Germany, assignor to Siemens Aktiengesellschaft, a corporation of Germany
Filed Oct. 23, 1965, Ser. No. 505,315
Claims priority, application Germany, Aug. 4, 1965, S 98,628
Int. Cl. H04l 15/24, 15/34
U.S. Cl. 178—2      5 Claims

ABSTRACT OF THE DISCLOSURE

A teletypewriter system which returns automatically the carriage to the start of the line when a carriage-return signal is received and in which system means are provided for interrupting the information portion of the message ahead of the input to the receiver of a receiving teletypewriter machine each time a carriage-return and line shift-command is received.

---

The invention relates to a teletypewriter installation of the type illustrated in copending patent application, Ser. No. 495,445, filed on Oct. 13, 1965.

Such application relates to a teletypewriter system with at least one sheet teletypewriter machine with carriage returnable automatically to the beginning of the line in dependance on a carriage return command, in which system means are provided for interrupting the information portion of the message flow at least ahead of the input of the receiver of the receiving sheet teletypewriter machine, after a carriage return and line shift command up until the carriage return special function has reached its conclusion at the line beginning.

According to the example of construction of this application, the interruption of the information flow is controllable by the transmitting machine. If, however, between transmitting and receiving machine there is a storer, as is the case in storage communication systems, the operations between transmitting machine and the storer can take place at a different telegraphing speed than that between the storer and receiving teletypewriter machine.

In such cases the means interrupting the message flow during carriage return according to the invention can be arranged following the storage device, in which arrangement they interrupt the information portion of the message for a predetermined time span. Consequently, interruptions of the above-mentioned type ahead of the storer are avoidable.

According to a further development of the invention there is allocated to the storage device a signal counter, with the aid of which the message interruption is variable according to the length of the last line in dependence on the time required for the carriage return. If this interruption is expressed in the number of filler signals, then in addition the telegraphing speed before the receiving machine is also contracted.

According to another further development of the invention, the signal counter is fixedly allocated to the line of the receiving subscriber.

According to another further development of the invention the signal counter in a teletypewriter installation with selector communication and line selector output is selectively connectable at subscriber stations having different operating values, i.e. subscriber stations that are arranged for different telegraphing speeds, in dependence on the position of the line selector.

Further details of the invention will appear from the example of construction described in the following and illustrated in the drawing, in which:

FIG. 1 is a basic circuit diagram of a teletypewriter system with storage communication system and signal counter arranged in the output line to a subscriber;

FIG. 2 is a basic (skeleton) circuit diagram of a telegraph system with storage communication system and signal counter allocated to such storer;

FIG. 3 shows an example for the operating course ahead of and behind the storage system with signal counter; and FIG. 4 is a basic circuit diagram of a signal counter system with control device for the automatic insertion of compulsory pauses dependent on line length.

In the circuit diagram according to FIG. 1 it is assumed that at the transmitting subscriber T1 there is a teletypewriter machine with normal telegraphing speed of 50 Bd. This feeds the message into an input storer ES and at the end of each line, transmits once the signal "carriage return and line space." For this subscriber there is no occasion at all for transmitting this carriage-return signal several times, because he frequently has no knowledge whatever as to what speed the receiving teletypewriter machine addressed is operating.

At the storage exchange SpV, the message is entered in the input storer ES. From there it is further conducted over a call finder into an intermediate storer ZS. The intrastation speed used here used is in the present case a matter of indifference. From the intermediate storer ZS the message is further conducted over the line selector LW to the subscriber T2, whose receiving sheet teletypewriter machine is set for a telegraphing speed of 200 Bd. This machine needs, in each case, an intermediate pause before the beginning of a new line in order to conclude the carriage return.

In FIG. 3 there are represented the corresponding sequences of the texts allocated to each line from subscriber T1 and subscriber T2 with inclusion of the necessary intermediate pauses following carriage return. These intermediate pauses can be subsequently inserted in the retransmitting of the message from intermediate storer ZS to subscriber T2. For this an additional counting device ZZ is utilized which is allocated either permanently to the line of subscriber T2, or according to FIG. 2, is allocated to the intermediate storer ZS and is switched on or off, in each case, in dependence on the position of the line selector LW. Which of the two solutions is selected depends on the number of receiving sheet teletypewriter machines with high telegraphing speed (for example, 200 Bd). If there are only a few receivers, the counting accessory will then be allocated to the subscriber line. If, in the system, the receivers are predominantly equipped with 200 Bd machines and the 50 Bd subscribers comprise the exception, it may then be more economical to allocate the counting accessory to the intermediate storer. The manner of functioning of the counting device is the same in both cases.

The signal counter ZZ contains a device which continuously counts the number of telegraph signals which are emitted according to a combination sequence, "carriage return/line advance." This counter is stopped as soon as a new sequence "carriage return/line advance" is detected. This combination sequence is transmitted to the subscriber T2. Thereupon, under positive actuation, a pause is inserted in the storage output process of the intermediate storer ZS. The duration of this pause can be adjusted in dependence on the number of signals counted. If the line has been given in full length, i.e. with 70 signs, then the intermediate pause after the combination "carriage return/line advance," for example, will amount to the length of three signals. If the seqence "carriage return/line advance" had already appeared after 35 signals (½ line), the pause is then made the length of only two signals. If the line has only a very short text, say, less than 10 characters, then there suffices for the return of the carriage the pause caused by the carriage return and line space signal. There is thereby achieved a saving of time for the intermediate pauses and it is thus possible to use the receiving machine in the best manner. If, on the other hand, the message is fed from an intermediate storer ZS to a receiver T3 which operates at 50 Bd, the counting device ZZ is not effective and no pause is added to the combination sequence "carriage return/line advance," but rather the transmisison of the text takes place in normal sequence.

FIG. 4 schematically illustrates an example of the construction and the connection of the signal counter with the accessory device for the recognition of "carriage return/line advance" and for the insertion of the necessary pause. The signal counter ZZ is connected with the intermediate storer ZS, with which there is associated a series-parallel converter SPU. This delivers, according to the telegraphing speed of the transmitting line, the reading frequency over a line LT to a core buffer storer KS which is arranged at the output of the intermediate storer.

In the transmission the telegraphing signals pass as spacing or marking current pulses over a control device BK to the electronic telegraph signal transmitter ETS and from there, to the subscriber line L*tg*. The series-parallel converter SPU is inserted in the line for the valuation of the teletypewriter characters. Over this path the signal evaluator B is controlled which detects the combination sequence WR/Z1. As soon as this signal sequence occurs there is excited over an auxiliary relay W the stop relay STOP. Parallel to this the core storer KS delivers for each fifth sign a signal over the signal line S. These signals are evaluable according to the particular requirements in the evaluating device A and excite relays R10, R35, R70. With the aid of the contacts *r*10, *r*35, *r*70, of these relays, the time constant of the resistance-capacitance circuit formed by the capacitor C and the resitsances W*d*1 . . . W*d*4 are controlled for the drop-out of the armature of the stop relay STOP, and, corresponding to the differing time constants, the pause for the retransmission of the signs is made longer or shorter as desired.

I claim:
1. In a teletypewriter system with at least one sheet teletypewriter machine with a carriage automatically returnable to line beginning in dependence upon a carriage-return command comprising, means for interrupting the information portion of the message flow after a carriage-return and line-advance command until the carriage-return special function has been carried through completely to the line beginning, and disposed at least before the input of the carriage of the receiving sheet teletypewriter machine, the combination of a storage device disposed between the transmitting and receiving machines which interrupts the message flow following the storer during carriage return for a predetermined period of time.

2. A teletypewriter system according to claim 1, wherein there is allocated to the storage device a signal counter, with the aid of which the message interruption is variable in stages according to the length of the last line in dependence on the time required for the carriage return.

3. A teletypewriter system according to claim 2, wherein the signal counter is permanently allocated to the line of the receiving subscriber.

4. A teletypewriter system according to claim 2 with selector exchange, wherein the signal counter is directly allocated to the intermediate storer in the selector exchange station.

5. A teletypewriter system according to claim 4 with line selector output to subscriber stations having different operational values, wherein the signal counter is switchable on and off in dependence on the position of a line selector.

References Cited

UNITED STATES PATENTS

| | | |
|---|---|---|
| 2,189,541 | 2/1940 | Burcky. |
| 2,669,602 | 2/1954 | Salmon et al. |
| 2,907,823 | 10/1959 | Wusteney et al. |
| 2,912,485 | 11/1959 | Kaufman et al. |

THOMAS A. ROBINSON, *Primary Examiner.*

U.S. Cl. X.R.

178—17.5, 42